US012728441B2

(12) United States Patent
Arthur et al.

(10) Patent No.: US 12,728,441 B2
(45) Date of Patent: Sep. 8, 2026

(54) ROBOTIC REPAIR CONTROL SYSTEMS AND METHODS

(71) Applicant: 3M INNOVATIVE PROPERTIES COMPANY, St. Paul, MN (US)

(72) Inventors: Jonathan B. Arthur, Hudson, WI (US); Aaron K. Nienaber, Maplewood, MN (US); Nicholas G. Amell, Minneapolis, MN (US); Thomas J. Strey, River Falls, WI (US); Erich A. Mielke, St. Paul, MN (US); Talha Ahsan, St. Paul, MN (US); Vincent J.L. Chevrier, St. Paul, MN (US); Thaine W. Fuller, Lakeland, MN (US); Brett R. Hemes, Woodbury, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 245 days.

(21) Appl. No.: 18/042,080

(22) PCT Filed: Aug. 16, 2021

(86) PCT No.: PCT/IB2021/057528
§ 371 (c)(1),
(2) Date: Feb. 17, 2023

(87) PCT Pub. No.: WO2022/038491
PCT Pub. Date: Feb. 24, 2022

(65) Prior Publication Data

US 2023/0321687 A1 Oct. 12, 2023

Related U.S. Application Data

(60) Provisional application No. 63/198,963, filed on Nov. 25, 2020, provisional application No. 62/706,475, filed on Aug. 19, 2020.

(51) Int. Cl.
*B05D 5/00* (2006.01)
*B25J 11/00* (2006.01)
(Continued)

(52) U.S. Cl.
CPC ........... *B05D 5/005* (2013.01); *B25J 11/0075* (2013.01); *B25J 19/023* (2013.01); *G06T 7/0004* (2013.01); *G06T 2207/30156* (2013.01)

(58) Field of Classification Search
CPC ..... B05D 5/005; B25J 11/0075; B25J 19/023; G06T 7/0004; G06T 2207/30156;
(Continued)

(56) References Cited

U.S. PATENT DOCUMENTS 5,078,496 A 1/1992 Parker et al.
5,153,445 A 10/1992 Stapleton
(Continued)

FOREIGN PATENT DOCUMENTS

CN 106770319 B 10/2019
CN 112326669 A 2/2021
(Continued)

OTHER PUBLICATIONS

International Search Report for PCT International Application No. PCT/IB2021/057528, mailed on Jan. 11, 2022, 8 pages.

*Primary Examiner* — Amara Abdi
(74) *Attorney, Agent, or Firm* — Vincent L. Pham; Katherine M. Scholz; Melissa E. Buss

(57) ABSTRACT

An imaging and repair system (100) is presented that includes a first imaging system (110) configured to image and detect a defect on a worksurface. The first imaging system comprises a first camera configured to capture a plurality of first images of the worksurface. The plurality of first images are stored in a data source. The system also includes a second imaging system (110) configured to image
(Continued)

and characterize an orange peel of the worksurface in an area proximate the defect. Characterizing the worksurface comprises identifying a delta value of orange peel. The system also includes a defect repair processor configured to select a repair strategy based on a defect type. The system also includes a defect modifier configured to modify the selected repair strategy based on the orange peel characterization of the worksurface. The system also includes a defect repair tool (120) configured to automatically effect the modified repair strategy.

8 Claims, 12 Drawing Sheets

(51) Int. Cl.
*B25J 19/02* (2006.01)
*G06T 7/00* (2017.01)

(58) Field of Classification Search
CPC .. G06T 2207/10028; G01N 2021/9518; G01N 21/8806
See application file for complete search history.

(56) References Cited

U.S. PATENT DOCUMENTS

| | | | | |
|---|---|---|---|---|
| 9,546,963 | B2 | 1/2017 | Hwang | |
| 10,657,419 | B2 | 5/2020 | Kurtz | |
| 11,850,695 | B2 | 12/2023 | Nienaber et al. | |
| 11,958,200 | B2 | 4/2024 | Chen | |
| 2003/0139836 | A1* | 7/2003 | Matthews | G01N 21/8806 700/109 |
| 2007/0243798 | A1 | 10/2007 | Annen | |
| 2015/0290764 | A1 | 10/2015 | Whipple | |
| 2016/0028936 | A1* | 1/2016 | Saphier | G02B 7/32 348/87 |
| 2018/0361589 | A1* | 12/2018 | Paquin | B25J 9/1697 |
| 2019/0096057 | A1* | 3/2019 | Allen | H04N 7/181 |
| 2019/0287237 | A1* | 9/2019 | de Bonfim Gripp | G06T 7/64 |
| 2021/0323167 | A1 | 10/2021 | Hemes | |
| 2021/0394328 | A1 | 12/2021 | Hemes | |
| 2022/0126319 | A1 | 4/2022 | Richardson | |
| 2023/0278225 | A1 | 9/2023 | Lepage | |

FOREIGN PATENT DOCUMENTS

| | | | | |
|---|---|---|---|---|
| CN | 212622274 | U | 2/2021 | |
| CN | 113043143 | A | 6/2021 | |
| CN | 113640317 | B | 11/2021 | |
| CN | 114720475 | A | 7/2022 | |
| CN | 114720476 | A | 7/2022 | |
| CN | 115446698 | A | 12/2022 | |
| CN | 115647997 | A | 1/2023 | |
| CN | 115890408 | A | 4/2023 | |
| CN | 219519248 | U | 8/2023 | |
| CN | 116852226 | A | 10/2023 | |
| CN | 116930187 | A | 10/2023 | |
| CN | 116945005 | A | 10/2023 | |
| CN | 219925528 | U | 10/2023 | |
| CN | 117007598 | A | 11/2023 | |
| CN | 220419181 | U | 1/2024 | |
| CN | 117571719 | A | 2/2024 | |
| CN | 117664980 | A | 3/2024 | |
| CN | 118229621 | A | 6/2024 | |
| CN | 118269117 | A | 7/2024 | |
| CN | 118533838 | A | 8/2024 | |
| JP | H05126758 | A | 5/1993 | |
| JP | H06294757 | A | 10/1994 | |
| JP | H08-086633 | A | 4/1996 | |
| JP | 2024103415 | A | 8/2024 | |
| WO | 2004020543 | A1 | 3/2004 | |
| WO | WO-2011144964 | A1 * | 11/2011 | G01N 21/8806 |
| WO | 2019112040 | A1 | 6/2019 | |
| WO | 2020/161534 | * | 8/2020 | |
| WO | 2020161534 | A1 | 8/2020 | |
| WO | 2021105865 | A1 | 6/2021 | |
| WO | 2021105867 | A1 | 6/2021 | |
| WO | 2022241414 | A1 | 11/2022 | |
| WO | 2023205258 | A1 | 10/2023 | |

* cited by examiner

Identify Defect 610

Characterize Orange Peel at Defect 620

Select a trajectory 630

Shape 632

Time 634

Other 636

Modify the trajectory 640

Defect Type 642

Defect Size 644

Orange Peel 646

Other 648

ROBOTIC REPAIR CONTROL SYSTEMS AND METHODS

CROSS REFERENCE TO RELATED APPLICATIONS

This application is a national stage filing under 35 U.S.C. 371 of PCT/IB2021/057528, filed Aug. 16, 2021, which claims the benefit of U.S. Application No. 62/706,475, filed Aug. 19, 2020, and U.S. Application No. 63/198,963, filed Nov. 25, 2020, the disclosure of which is incorporated by reference in its/their entirety herein.

BACKGROUND

Clear coat repair is one of the last operations to be automated in the automotive original equipment manufacturing (OEM) sector. Techniques are desired for automating this process as well as other paint applications (e.g., primer sanding, clear coat defect removal, clear coat polishing, etc.) amenable to the use of abrasives and/or robotic inspection and repair.

Prior efforts to automate the detection and repair of paint defects include the system described in US Patent Publication No. 2003/0139836, which discloses the use of electronic imaging to detect and repair paint defects on a vehicle body. The system references the vehicle imaging data against vehicle CAD data to develop three-dimensional paint defect coordinates for each paint defect. The paint defect data and paint defect coordinates are used to develop a repair strategy for automated repair using a plurality of automated robots that perform a variety of tasks including sanding and polishing the paint defect.

SUMMARY

An imaging and repair system is presented that includes a first imaging system configured to image and detect a defect on a worksurface. The first imaging system comprises a first camera configured to capture a plurality of first images of the worksurface. The plurality of first images are stored in a data source. The system also includes a second imaging system configured to image and characterize an orange peel of the worksurface in an area proximate the defect. Characterizing the worksurface comprises identifying a delta value of orange peel. The system also includes a defect repair processor configured to select a repair strategy based on a defect type. The system also includes a defect modifier configured to modify the selected repair strategy based on the orange peel characterization of the worksurface. The system also includes a defect repair tool configured to automatically effect the modified repair strategy.

BRIEF DESCRIPTION OF THE DRAWINGS

In the drawings, which are not necessarily drawn to scale, like numerals may describe similar components in different views. The drawings illustrate generally, by way of example, but not by way of limitation, various embodiments discussed in the present document.

DETAILED DESCRIPTION

Figure 1:
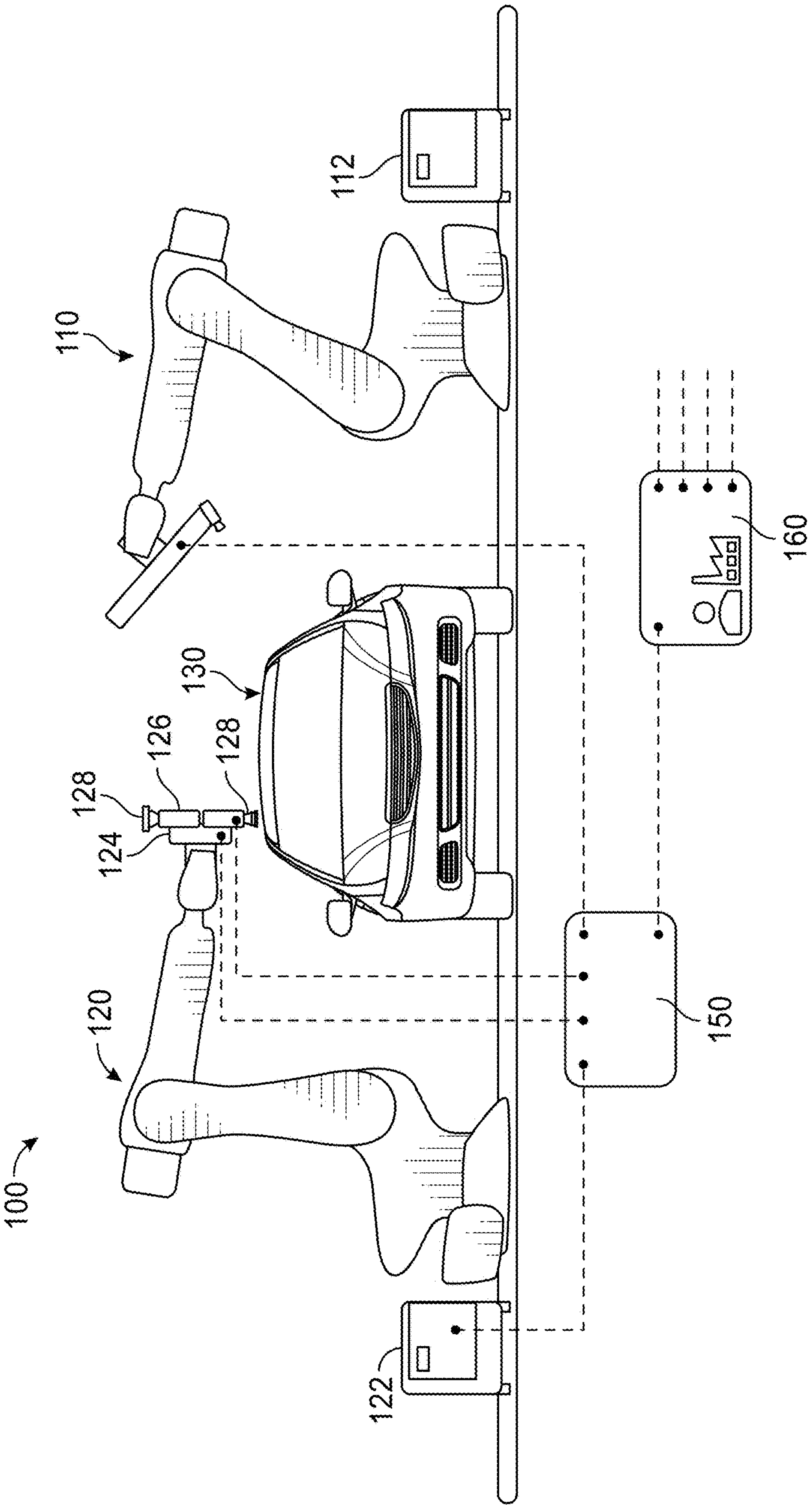
FIG. 1 is a schematic of a robotic paint repair system in which embodiments of the present invention are useful.

Recent advancements in imaging technology and computational systems has made feasible the process of clear coat inspection at production speeds. In particular, stereo deflectometry has recently been shown to be capable of providing images and locations of paint and clear coat defects at appropriate resolution with spatial information (providing coordinate location information and defect classification) to allow subsequent automated spot repair.

As used herein, the term "vehicle" is intended to cover a broad range of mobile structures that receive at least one coat of paint or clear coat during manufacturing. While many examples herein concern automobiles, it is expressly contemplated that methods and systems described herein are also applicable to trucks, trains, boats (with or without motors), airplanes, helicopters, etc.

As used herein, the term "worksurface" is intended to cover any surface on which a defect repair is attempted. The worksurface includes an area with a detected defect, an area surrounding the detected defect affected during an abrasive operation, as well as an area surrounding the affected area that may include a textured surface, characterized by the presence of orange peel.

The term "paint" is used herein to refer broadly to any of the various layers of e-coat, filler, primer, paint, clear coat, etc. of the vehicle that have been applied in the finishing process. Additionally, the term "paint repair" involves locating and repairing any visual artifacts (defects) on or within any of the paint layers. In some embodiments, systems and methods described herein use clear coat as the target paint repair layer. However, the systems and methods presented apply to any particular paint layer (e-coat, filler, primer, paint, clear coat, etc.) with little to no modification.

As used herein, the term "defect" refers to an area on a worksurface that interrupts the visual aesthetic. For example, many vehicles appear shiny or metallic after painting is completed. A "defect" can include debris trapped within one or more of the various paint layers on the worksurface. Defects can also include smudges in the paint, excess paint including smears or dripping, as well as dents.

Paint repair is one of the last remaining steps in the vehicle manufacturing process that is still predominantly manual. Historically this is due to two main factors, lack of sufficient automated inspection and the difficulty of automating the repair process itself. Paint and clear coat repair standards surround aesthetics judged by the human eye—the dealership accepting the vehicle and the eventual customer who will inspect the vehicle prior to purchase. Robots are traditionally designed to provide a "perfect," or highly "regular" repair—with clear, defined edges and an even cut (see FIG. 4B). Unfortunately, this causes the repair to be highly visible to the human eye. Systems and methods described herein address ways to add irregularity to the paint repair process, such that repaired defects better blend into a vehicle surface and are less detectable by a customer.

FIG. 1 is a schematic of a robotic paint repair system in which embodiments of the present invention are useful. System 100 generally includes two units, a visual inspection system 110 and a defect repair system 120. Both systems may be controlled by a motion controller 112, 122, respectively, which may receive instructions from one or more application controllers 150. The application controller may receive input, or provide output, to a user interface 160. Repair unit 120 includes a force control unit 124 that can be aligned with an end-effector 126. As illustrated in FIG. 1, end effector 126 includes two tools 128, as further described in U.S. Provisional Patent Application 62/940,950 filed on Nov. 27, 2019. However, other arrangements are also expressly contemplated.

A more detailed discussion of robotic repair trajectories can be found in U.S. Provisional Patent Application 62/941,286 filed on Nov. 27, 2019, which is herein incorporated by reference.

The first of the two main challenges, inspection of vehicle 130 by inspection unit 110, is interesting due to the nature of the underlying problem domain. In general, the surface of interest is very large in comparison to the defects themselves, with the difference being multiple orders of magnitude. This results in trade-offs between field of view and resolution when it comes to sensor selection. Additionally, each paint layer of the finishing process (e-coat, primer, paint, clear coat, etc.) differs in its visual appearance with specularity being particular noteworthy. Highly specular surfaces (i.e., high-gloss or highly reflective surfaces) pose unique imaging challenges. These issues together make inspection difficult. Recent progress in the last few years has been made in this area making use of increasing computational resources, resulting in the availability of several commercial solutions. The presence of a sufficiently capable inspection system 110 is important for identifying defects for repair by repair unit 120.

The current state of the art in vehicle paint repair is to use fine abrasive and/or polish systems to manually sand/polish out the defects, with or without the aid of a power tool, while maintaining the desirable finish (e.g., matching specularity in the clear coat). An expert human executing such a repair leverages many hours of training while simultaneously utilizing their senses to monitor the progress of the repair and make changes accordingly. Such sophisticated behavior is hard to capture in a robotic solution with limited sensing.

Additionally, abrasive material removal is a pressure driven process while many industrial manipulators, in general, operate natively in the position tracking/control regime and are optimized with positional accuracy and precision in mind. The result is extremely precise systems with extremely stiff error response curves (i.e., small positional displacements result in very large corrective forces) that are inherently bad at effort control (i.e., joint torque and/or Cartesian force)). Closed-loop force control approaches have been used (with limited utility) to address the latter along with more recent (and more successful) force controlled flanges that provide a soft (i.e., not stiff) displacement curve much more amenable to sensitive force/pressure-driven processing. The problem of robust process strategy/control, however, remains and is the focus of this work.

Figure 2:
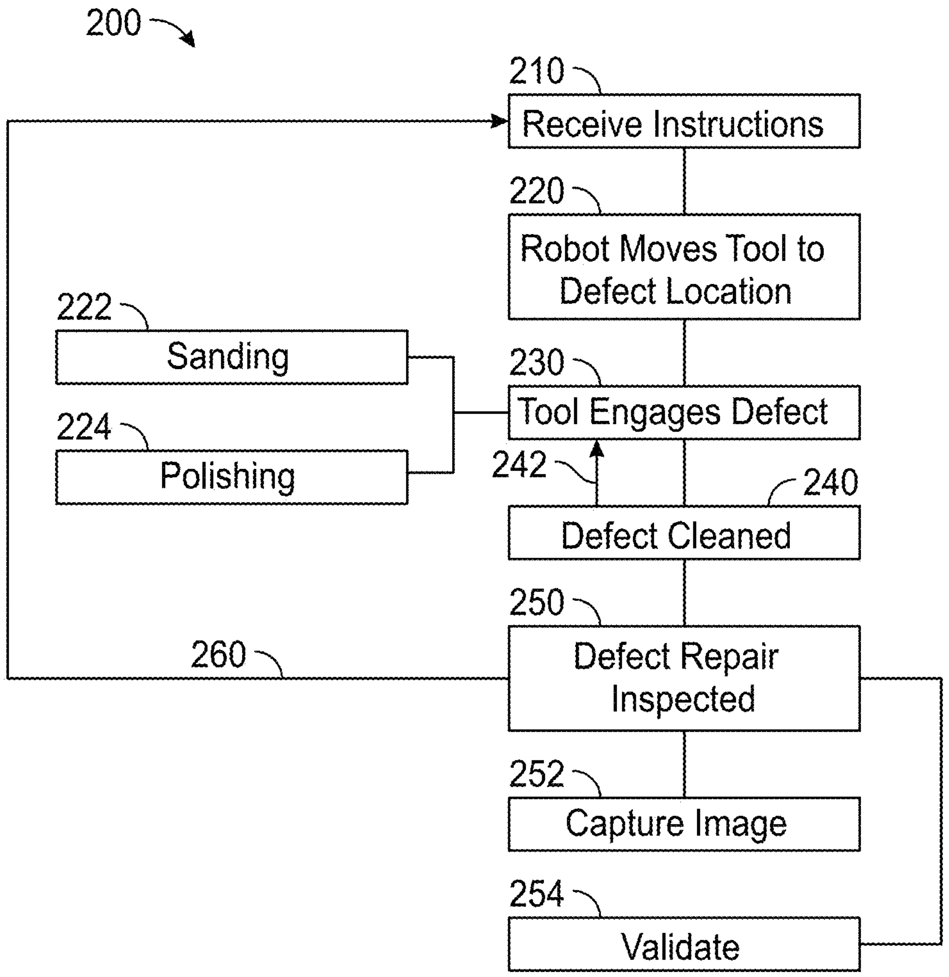
FIG. 2 illustrates a method of robotic defect repair in accordance with embodiments herein.

FIG. 2 illustrates a method of robotic defect repair in accordance with an embodiment of the present invention. Method 200 is an overview of how a robotic repair system repairs a defect in accordance with at least some embodiments described herein.

In block 210, instructions are received from a robot controller, such as application controller 150 in FIG. 1, for example. The instructions include movement instructions for different components of a robotic repair unit.

In block 220, a robotic motion controller moves an abrasive article, mounted to a tool, in place to prepare to engage a defect. Defect locations on a vehicle are known from an inspection system. Moving the abrasive article into place includes moving the article on top of, or near, the defect. This position may be referred to as the nominal pose of the backup pad.

In block 230, the abrasive article engages the defect. Engaging the defect may include sanding the defect area, as indicated in block 232, or polishing the defect area, as indicated in block 234. Engaging the defect also includes varying different repair parameters of the backup pad, with respect to the nominal pose, such as the velocity 232 of the backup pad, the force 334 imparted to the backup pad, an orientation offset 236 of the backup pad, and an eventual shape of repair 238 created by the sanding and polishing operation.

In block 240, the defect area is cleaned. Cleaning may include wiping away any fluids used in sanding or polishing, as well as wiping away debris. As indicated in block 242, after a cleaning step, the tool may re-engage the defect. For example, a dual mounted tool system may have a sanding unit and a polishing unit available such that, after cleaning is accomplished, the next repair step can be accomplished.

In block 250, the defect area is inspected, to determine whether the repair is sufficient. If additional repair is needed, method 200 may receive new instructions, as indicated by arrow 260, and the method may repeat. Inspecting a defect repair may include capturing post-repair images 252, which may be presented to a repair operator or saved as needed. Inspecting may also include validating the repair, as indicated in block 254, which may include comparing pre- and post-repair images, detecting whether a defect will be visible/noticeable to the human eye, or another suitable validation technique.

Human repair technicians introduce some randomness into the repair process for a defect, often resulting in a blending of the repair into the surrounding surface. This is more difficult to replicate in a robotic repair system because of the texture on a worksurface. When paint is applied to a worksurface in a manufacturing environment, environmental interferences (such as movement or vibration of the vehicle, movement of circulating air, and properties of the paint applied) cause a textured surface such as that illustrated in FIGS. 3A and 3B, which is commonly referred to as "orange peel" because of its appearance. Orange peel can also be added to a clearcoat surface intentionally so that different levels of orange peel texture and add to the aesthetics of different surfaces of a vehicle.

In general, it is desired to 'perfectly' repair any defects present in the paint, however, the notion of a perfect repair is largely subjective and thus a formal definition is elusive. Informally, a 'perfect' repair as one in which the end result is visually indistinguishable to the human eye from an otherwise defect-free area of the worksurface while the notion of an optimal repair is taken to mean the best repair possible given some starting state. For example, not all defects can be repaired to a perfect state. Additionally, time is a critical parameter for defect repair, as vehicle manufacturing is often an assembly line process. An efficient repair, then, can be characterized as a repair that makes the defect area indistinguishable in as short a time as possible.

The human eye is highly adept at noticing 'perfect' or 'regular' items in nature as well as abrupt transitions in boundary or texture. This sensitivity to abrupt visual boundary transitions necessitates control of transitions between the repaired area and unrepaired area. One aim of a repair is to maximize the concealment of the defect repair on the finished article.

Figure 3A:
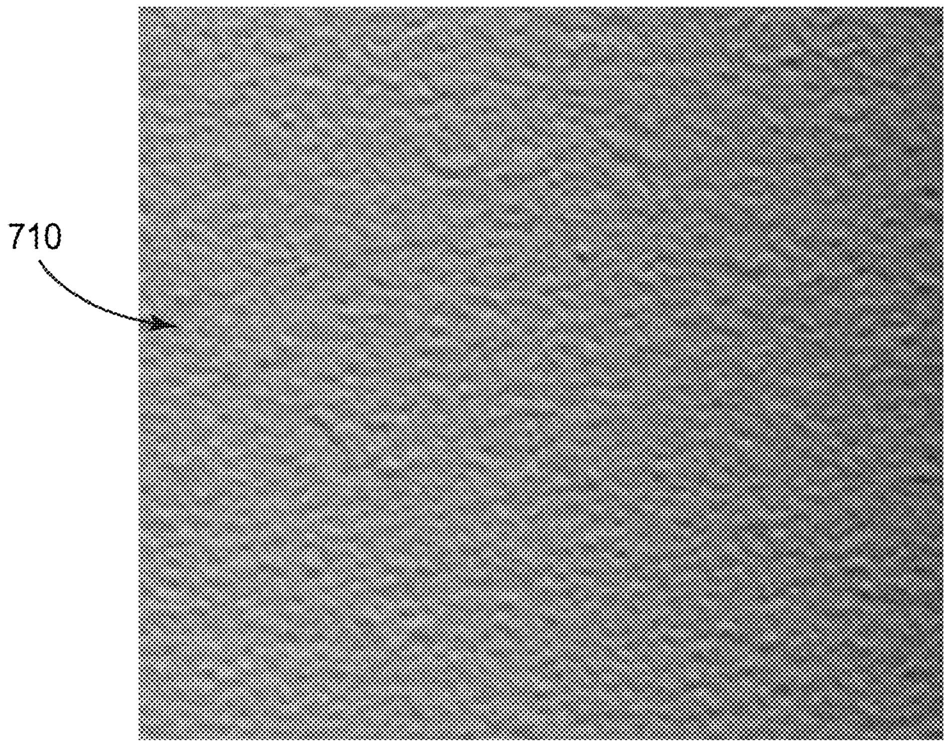
FIGS. 3A-3B illustrate images of orange peel.
Figure 3B:
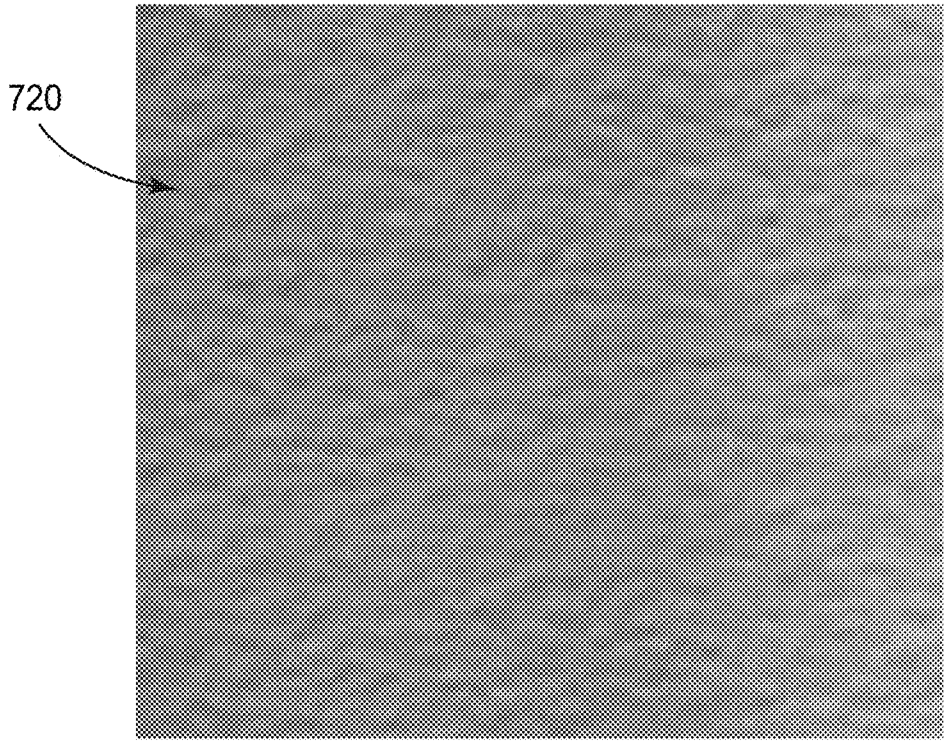

In order to better blend the repair into the surrounding worksurface area, a reliable method is needed to characterize the surface area. Currently, orange peel is often characterized on a numerical scale from 1-10, for example with FIG. 3A illustrating an example of a "2" and FIG. 3B illustrating an example of a "5". However, different vehicle manufacturers may measure and characterize orange peel differently.

Additionally, while hand-held devices exist that can provide a numerical characterization of an orange peel, these devices cannot be calibrated to match a manufacturer's standards. Additionally, the hand-held devices are not networked into a repair system and do not provide an output that can be used to modify or adjust a repair strategy. For example, repair strategies (discussed in greater detail in U.S. Provisional Patent Application 62/941,286 filed on Nov. 27, 2019) may need to be altered based on whether a surrounding orange peel is rated at a "1" or an "8," so that the repair better blends into the surface.

Additionally, while systems exist that can characterize orange peel generally, there exists a need to characterize orange peel in the area immediately surrounding a defect, as orange peel can vary, for example, from one area of a car hood to another area of the car hood. While some systems may rely on sampling of a surface to guess an orange peel value at a given defect area, this is only an estimation and may be incorrect.

A system is needed that can automatically detect and characterize orange peel in an area surrounding a defect. The system should integrate the orange peel characterization into a repair strategy generation sequence such that the repair strategy is based on the orange peel of the surface immediately surrounding the defect. In some embodiments, the repair strategy is automatically altered based on the automatic detection of the orange peel, such that orange peel characterization becomes an internal system parameter that requires no operator intervention. Alternatively, or additionally, the orange peel characterization may also be presented to an operator, either in the context of the repair strategy or as a separate component.

Systems and methods herein provide an integrated orange peel detection system in a robotic repair system that automatically detects and characterizes orange peel in an area around a defect on a vehicle surface. The system may also detect and characterize a contour of the vehicle surface. The orange peel system may include a camera and structured light system that may include components that are also used for detecting of the defects themselves. Systems and methods herein may also provide an orange peel detection system that is mounted on a robotic repair unit such that the orange peel can be measured contemporaneously with the defect repair.

Figure 4:
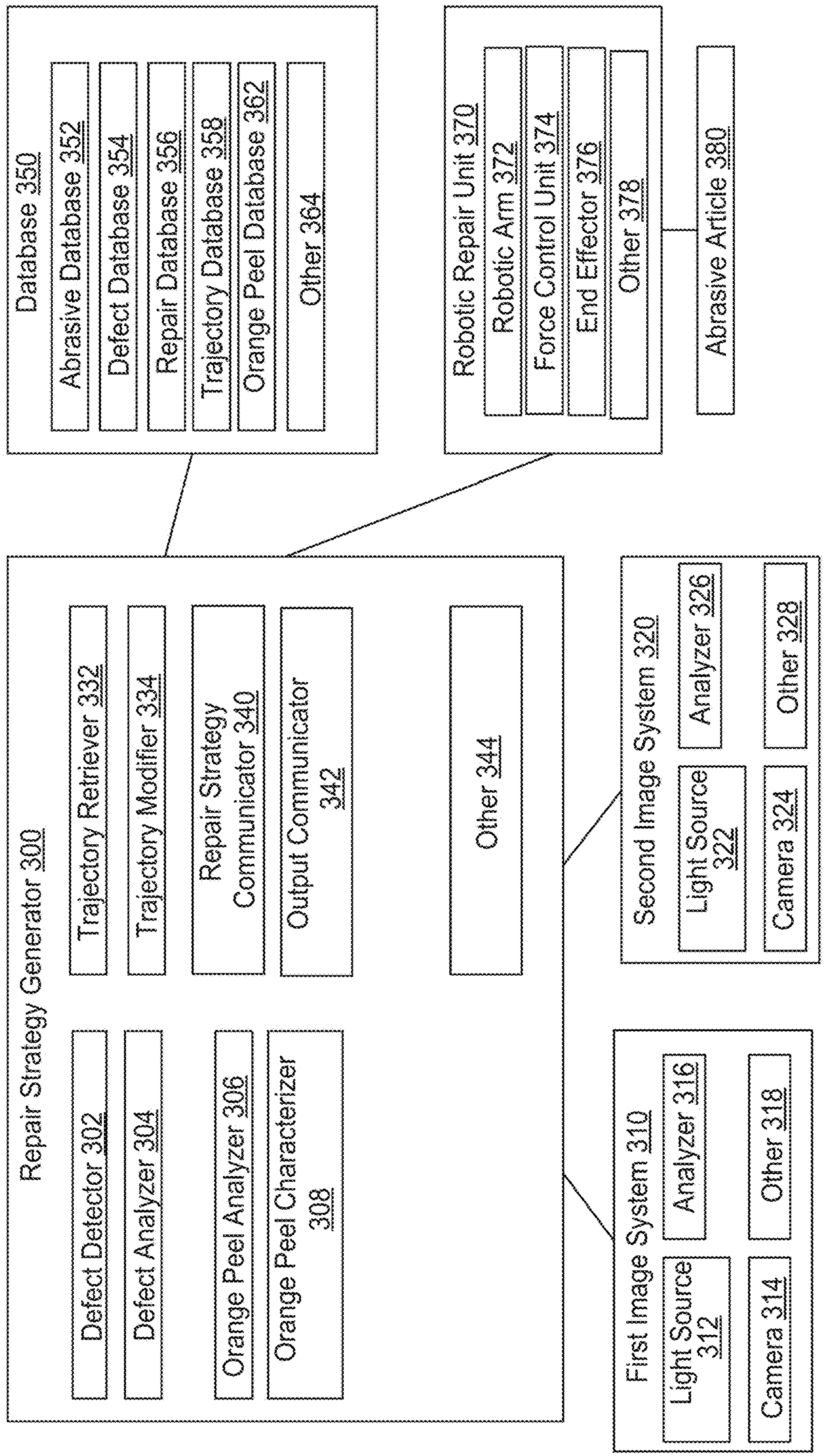
FIG. 4 illustrates a repair strategy generator in accordance with embodiments herein.

FIG. 4 illustrates a repair strategy generator in accordance with embodiments herein. A first imaging system 310 has a light source 312, a camera (or other imaging device) 314, an analyzer 316, and may have other components 318. A second imaging system 320 also has a light source 322, a camera 324, an analyzer 326 and other components 328. While imaging systems 310 and 320 are illustrated as separate systems with separate components, it is also envisioned that, in some embodiments, the systems share components. For example, a single light source 312 may be used for both a defect detection system 310 and an orange peel characterization system 320. Additionally, a single analyzer, with a processing unit, may support both a defect detection system 310 and an orange peel characterization system 320. Further, while each of systems 310, 320 are illustrated as having a processor 316, 326, it is expressly contemplated that systems 310, 320 may, in some embodiments, only take images of a surface and analysis and processing may take place within a separate device that receives the images from systems 310, 320.

A database 350 may be communicatively coupled to repair strategy generator 300, for example over a network, or may be incorporated into a memory of repair strategy generator 300. Database 350 may include information including, but not limited to, abrasive articles 352 that may be currently in-use or available for use by robotic repair unit 370. Database 350 may also include information on a plurality of defects 354 which may be detected on a surface such as excess paint, scratches, paint smudges, particles captured under a layer of paint, or other defects. Database 350 may also store historic repair information 356, for example categorized by a detected defect, a repair trajectory used, or an orange peel of the surface during repair, or another characteristic. Database 350 may also include information on available repair trajectories 358, and may also include information on what trajectories may be suitable for a given defect, or based on a detected orange peel. As discussed in greater depth in U.S. Provisional Patent Application Ser. No. 62/941,286 filed on Nov. 27, 2019, trajectories may be based on a repair path that is designed to blend a repair into the worksurface of a vehicle. Database 350 may also include information on orange peel 362, such as calibration information for converting a calculated orange peel into a standard orange peel designation used by a given vehicle manufacturer. Other orange peel characteristic information may also be stored, such as deviations to a trajectory needed based on a detected orange peel depth or frequency. Database 350 may also include other information 364.

Repair strategy generator 300 is communicatively coupled to a robotic repair unit 370, which includes a robotic arm 372, which is coupled to a force control unit 375 associated with an end effector 376. Robotic repair unit may have other features 378 as well, for example a rail unit allowing movement along a manufacturing line. End effector 376 may be coupled to a tool with an abrasive article 380, which contacts a defect on a vehicle surface and conducts an abrasive operation. Robotic repair unit 370 is configured to move abrasive article 380 along a path on a vehicle surface, applying an amount of force for a given time at a series of points on the vehicle surface. Depending on the abrasive article, the force may also be applied at a given angle. Repair strategy generator 300 generates a trajectory for robotic repair unit 370 to carry out. The trajectory is generated based on the detected defect, known characteristics about the vehicle surface (e.g. color, number and thickness of coatings) and the abrasive article (e.g. wear level), as well as the orange peel characteristics at the defect location.

Defect detector 302 detects a defect on a vehicle surface, for example by receiving images from first imaging system 310 and analysis from analyzer 316 indicating that a defect is present. Defect analyzer 304 may detect a type of defect, as well as other characteristics of a detected defect. For example, a defect may be detected based on light refracting off the surface in an unexpected way. Defect analyzer 304 may determine that the detected defect is a trapped piece of debris under one or more layers of paint or clear coat. The trapped piece of debris may affect an area on the vehicle surface that is detected by defect analyzer 304. The depth of the piece of debris may also be important for repair.

An orange peel analyzer 306 may receive images from second image system 320, and, based on the images, determine an intensity of orange peel on the surface. Orange peel is characterized as a series of repeating bumps on a vehicle surface, similar to those on the exterior of a peel on an orange. The orange peel, referring back to FIGS. 3A and 3B refers to the rolling ridges and valleys within the glossy surface of paint. The rolling ridges may be larger (3B) or smaller (3A) depending on process conditions. Currently, many vehicle manufacturers characterize orange peel with a single number, with a one referring to tight formations of orange peel patterns and a ten referring to very gentle orange peel.

Orange peel characterizer 308 may characterize the orange peel based on analysis from orange peel analyzer 306. Most orange peel characterization is currently done using a hand-held device or a reference card held up to the area and might be done periodically in the paint shop to make sure the expected level of orange peel is maintained on the particular area of the car. The process is highly subjective. In addition to providing a numerical value for orange peel on a vehicle, orange peel characterizer 308 may also provide other characterization information, including average height of detected orange peel, frequency, and any other characteristics that may be helpful for modifying a repair trajectory.

Trajectory retriever 332 retrieves a trajectory for a repair, for example from trajectory data source 358. The retrieved trajectory may be based, for example, on a detected defect type or size, and/or based on a defect location—e.g. on a relatively flat or curved surface of a vehicle surface. Trajectory modifier 334 may alter the retrieved trajectory based on the orange peel characteristics identified by orange peel characterizer 308. The retrieved trajectory may be retrieved from a database, for example, as a pre-generated trajectory template, or may be retrieved from a trajectory generator.

For example, if a scanned area is flat, with minimal orange peel, the processing time for a selected trajectory may have a total time reduced by 25% to compensate for the process not needing to smooth the orange peel through the defect. However, if a scanned area has much more significant orange peel than expected, the repair trajectory may have a total time increased by 20% to allow for the process to compensate for the depth and frequency of the orange peel.

Output communicator 342 may also provide information about detected defects, characterized orange peel, and/or repair trajectories to another device. For example, an operator may receive such information on a mobile device, such as a smart phone or computer. Additionally, such information may be presented on a user interface associated with a given repair area.

Repair strategy communicator 340 communicates a modified trajectory to robotic repair unit 370. In some embodiments, the process of retrieving and modifying a trajectory for robotic repair unit 370 occurs in-situ, such that imaging systems (310, 320) verifies the location of a defect, detect and characterize the orange peel on the vehicle surface around the defect, and provide a modified trajectory for robotic repair unit 370 to execute all while a vehicle is in a position for a repair. During manufacturing of vehicles, a vehicle may be on a moving line such that it does not stop at any given station. The repair strategy generator 300, in such implementations, needs to quickly gather information about the defect, the surface, and determine an appropriate repair trajectory within minutes or seconds such that the repair can be timely completed. Even in manufacturing situations that envision a vehicle stopping in place at a repair station do not allow for a long repair time.

Repair strategy generator 300 may also include other components, such as any of the components discussed in U.S. Provisional Patent Application with Ser. No. 62/941,286 filed on Nov. 27, 2019.

Imaging systems 310, 320 are illustrated in FIG. 4 as two separate systems. However, as illustrated in FIG. 5, they may share at least some components, in some embodiments. Additionally, either or both of imaging systems 310, 320 may be mounted to robotic repair unit 370. For example, in one embodiment, an orange peel imaging system 320 may be mounted on an end effector unit 376, or elsewhere on robotic repair arm 370, such that orange peel is imaged, analyzed and characterized just before an abrasive article 380 contacts a vehicle surface and executes a repair. In some embodiments, both first and second systems 310, 320 are mounted separately from robotic repair unit 370.

Figure 5A:
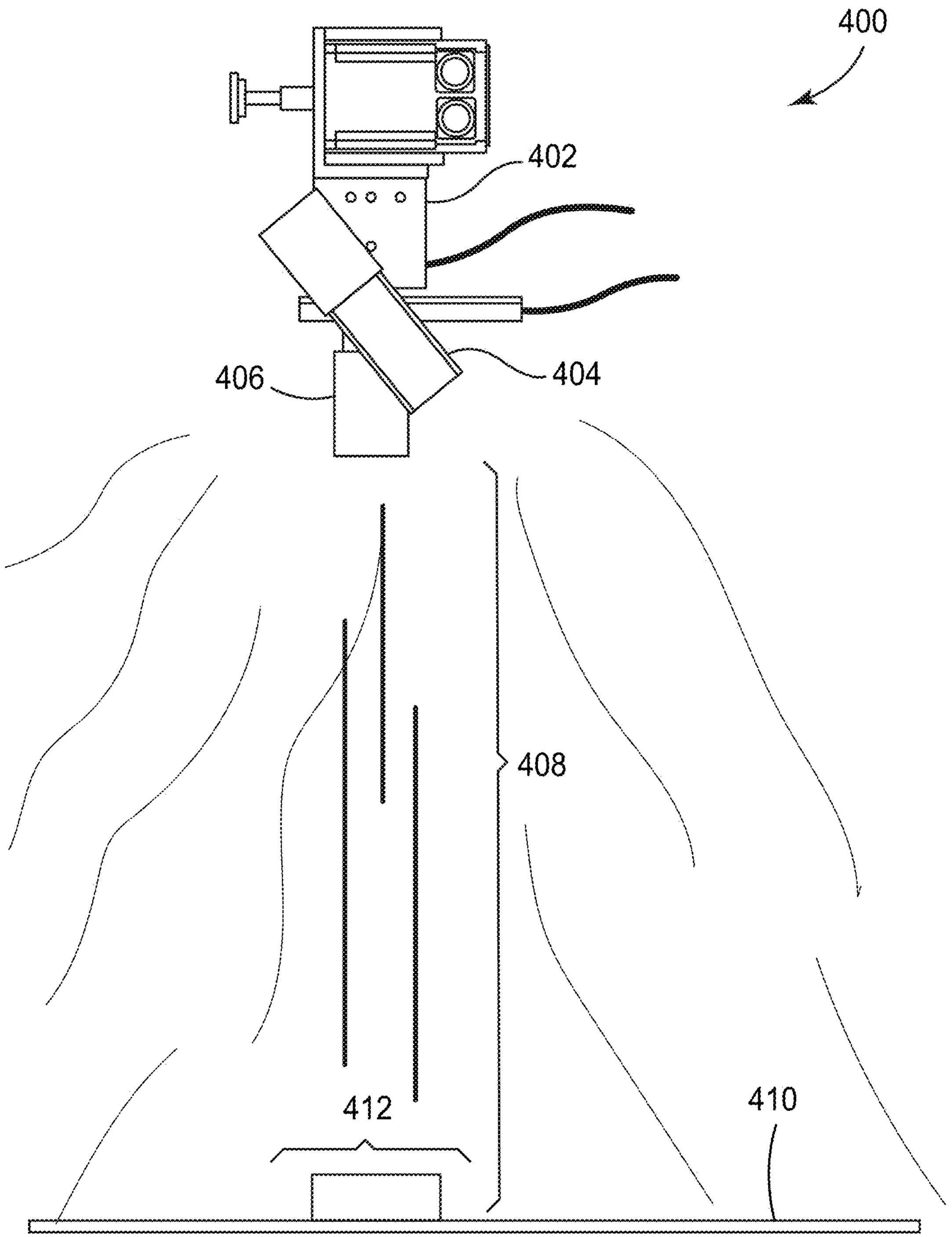
FIGS. 5A and 5B illustrate imaging systems for detecting orange peel on a worksurface in embodiments herein.
Figure 5B:
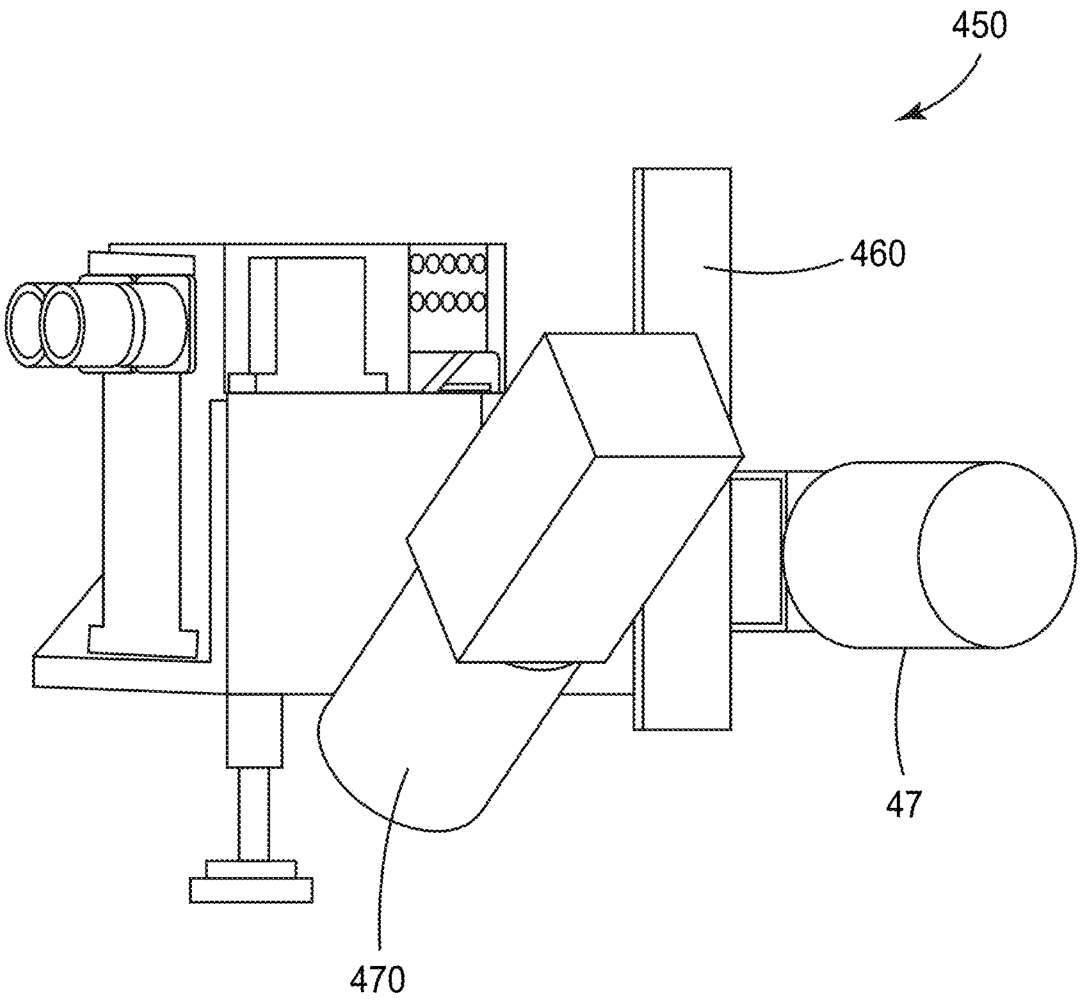

FIGS. 5A-5B illustrate a repair imaging system in accordance with embodiments herein. FIG. 5A illustrates an imaging system 400 imaging a surface 410. Surface 410 is a reflective surface, for example with one or more layers of clear coating applied in the surface. System has a distance 408 between a camera 406 and surface 410. A light bar 404 provides light on surface 410 in an area of focus 412. System 400 has a processing unit 402 that provides power, control and network access of camera 406 and light bar 404. In some embodiments, separate control and power sources are provided for each of camera 406 and light bar 404, as illustrated in FIG. 5A. However, it is contemplated that both camera 406 and light bar 404 may be powered and controlled by a single source 402. While a light bar 404 is illustrated, other illumination sources are also expressly contemplated.

In some embodiments, light bar 404 is positioned at an angle with respect to an area of focus 412, as illustrated in FIG. 5A, with a preferred angle being one that places the reflected bar in the center-most 25% of the image, which may reduce optical distortion. In some embodiments, the light from light bar 404 is brighter than any other potentially interfering light sources. In some embodiments blue hues and/or yellow hues are isolated from interference. In some embodiment, the light diffusion makes individual LED point sources undetectable.

In some embodiments, the distance 408 between camera 406 and surface 410 is relatively small, for example less than 1000 mm, or even less than 900 mm, or even less than 800 mm, or even less than 700 mm, or even less than 600 mm, or even less than 500 mm, or even less than 400 mm, or even less than 300 mm.

In one embodiment, a light length 408 is larger than the area of focus 412. Light length 408 may be ten times the size of area of focus 412. In one embodiment, a light length 408 is about 450 mm while area of focus 412 is 10 mm.

In one embodiment, system 400 is part of a robotic repair unit, for example mounted on a robot arm. System 400 may be included as part of an end effector assembly, or may be mounted upstream of a force control unit. System 400 may also be configured to move while images of a surface are being taken, for example system 400 may move across a vehicle surface to collect images. In another embodiment, system 400 may be configured to be stationary while images are captured.

FIG. 5B illustrates another view of a camera system 450. A light source 460 is positioned between first and second cameras 470. Cameras 470, and light source 460, can pivot with respect to a mount in some embodiments.

Cameras 406 and 470, in some embodiments, are general purpose cameras configured to capture images that can be stored, for example in a database like database 350 as part of repair database 356 (e.g. before or after repair images), and may be later retrieved, for example to display to an operator or for later analysis. Cameras 406 and 470 may also be used for other monitoring purposes, for example to monitor the repair process to detect wear of abrasive articles, or other functionality issues of robotic repair units or other manufacturing line equipment.

Cameras 406 and 470, in some embodiments, are also networked into manufacturing line and can receive information about a vehicle being imaged. This allows for cameras 406, 570 to be calibrated to the parameters of a given vehicle including the paint color, thickness of paint and clear coat layers, curvature of the surface where the defect is detected, etc. For example, many surfaces on automobiles are not flat. Knowing where a defect is on a car, and having access to a CAD model of the vehicle can provide curvature information for the car at the point of the defect, allowing for better analysis of the images retrieved by camera 406 or 470.

Figure 6:
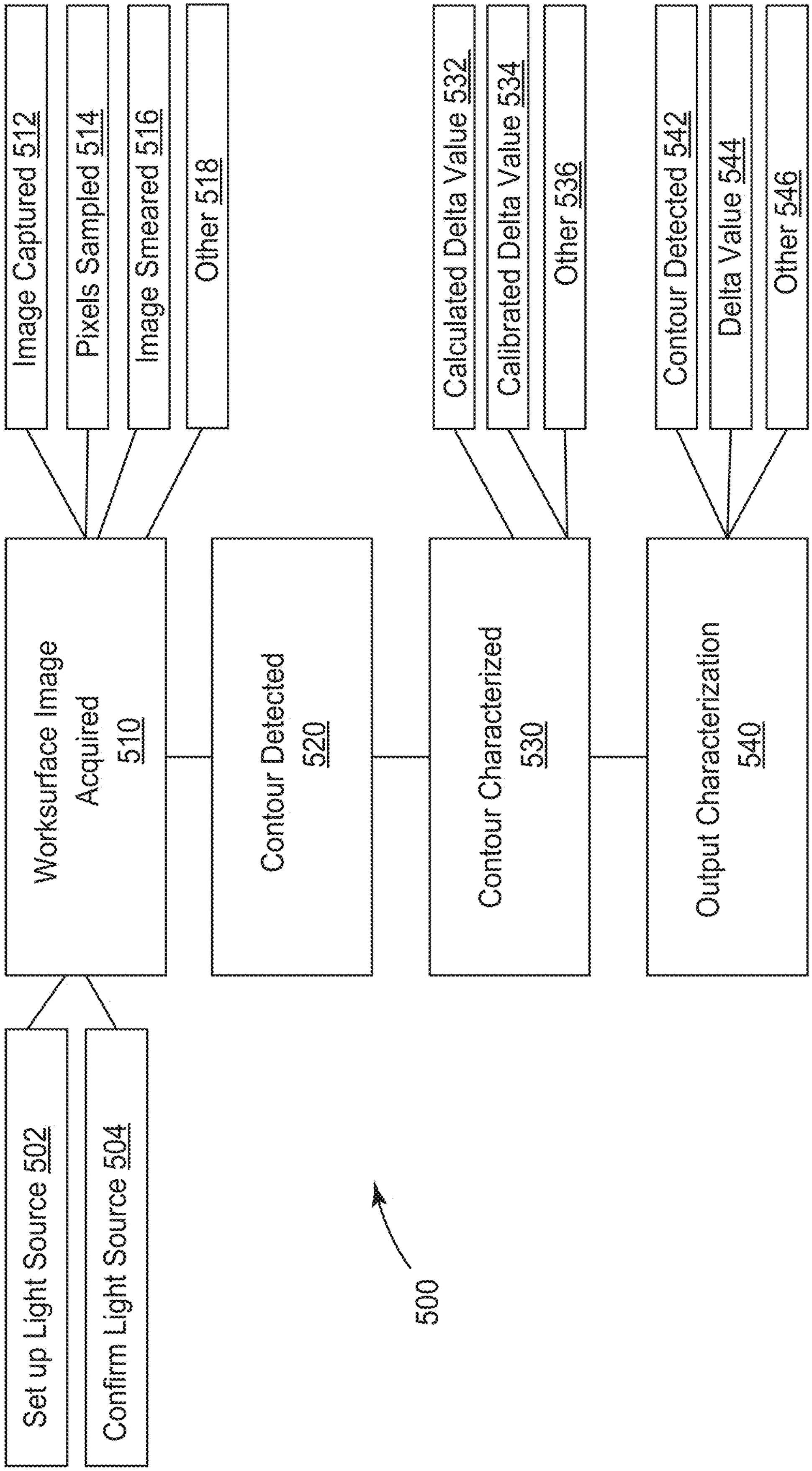
FIG. 6 illustrates a method of characterizing a worksurface area in embodiments herein.

FIG. 6 illustrates a method of characterizing a worksurface in accordance with embodiments herein. Method 500 provides a characterized worksurface that may be useful for modifying or generating a repair trajectory for repairing a defect in or near the characterized worksurface.

In block 510, an image of a worksurface is acquired. Acquiring an image, in some embodiments, includes setting up a light source, as illustrated in block 502, which may include positioning a light bar, or other suitable light source, at an angle with respect to a surface to be imaged. The light source may also be confirmed, as indicated in block 504, for example by confirming that sufficient reflection is captured from the correct area on the surface to be imaged.

Acquiring an image may include a camera capturing an image, as indicated in block 512. The camera may be a high resolution camera, for example, such that a sufficient number of pixels are present in the image to detect surface features. Because of the number of pixels, however, characterization of orange peel on a surface can be time consuming. Therefore, in some embodiments, it is desired to reduce the calculation size needed. Because of the short time frame to detect and repair defects, calculations of orange peel and other surface characteristics must be done quickly so that the manufacturing line is not slowed to accommodate defect repair.

As indicated in block 514, the image may be sampled, which includes taking a sampling of the pixels in the image to process. A smear process, as indicated in block 516, may also be used to generalize the image so that the calculation is a manageable size. Other processing may also be done, as indicated in block 518. For example, a confirmation of the presence of a hot spot may be saved or output to an operator.

In block 520, a contour is detected. A contour may be detected by noting differences in nearby pixels indicative of a curve that is not associated with planned curvature of a worksurface. For example, an automobile may have intended curvature, known from a CAD model of a surface. A contour may be detected that is much smaller than the intended curvature, at least one order of magnitude smaller. The contour may be detected by detecting a change in pixel color indicative of curvature. For example, referring back to the orange peel images of FIGS. 3A and 3B, contours can be detected in the change in adjacent pixel color.

In block 530, the contour is characterized. Characterizing orange peel typically includes calculating a delta value indicative of the level of orange peel, for example the numbers "2" and "5," referring to FIGS. 3A and 3B, respectively. Additionally, the calculated delta value may be calibrated to a manufacturer's standards. Since many manufacturer's have responded to the orange peel problem by developing their own orange peel scales, one benefit of using an orange peel characterization system networked into a manufacturer's repair system is the ability to output an orange peel characterization that matches the standards used by the manufacturer. However, other characterization may also be done, as indicated in block 536.

In block 540, the characterization is output. Outputting a characterization may include outputting a calculated or calibrated delta value to a user interface visible to an operator. Outputting may also include storing a calculated or calibrated delta value to a database. Outputting may also include providing a calculated or calibrated delta value to a repair strategy generator.

Method 500, in some embodiments, proceeds automatically. Method 500 may begin when a defect is detected, for example by analyzing the same imaging used to detect the defect. In another embodiment, method 500 proceeds automatically only when a repair robot is within a given distance of the defect, as illustrated in FIG. 5A, for example, such that orange peel is calculated for a given defect at substantially the repair time. Method 500 may also proceed automatically at a different time, for example substantially at a time when a defect is detected.

Figure 7:
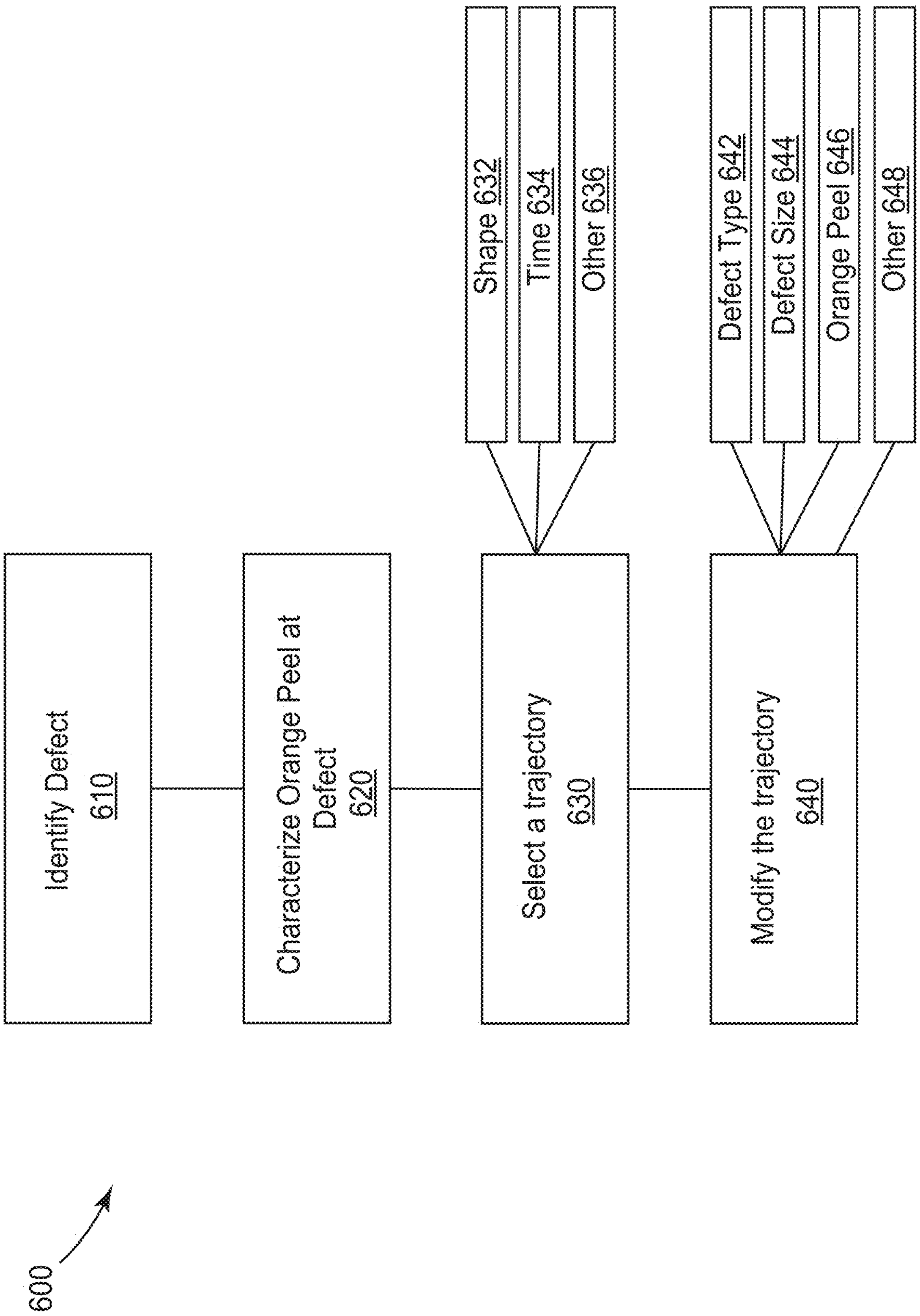
FIG. 7 illustrates a method of modifying a repair strategy in embodiments herein.

FIG. 7 illustrates a method of generating a repair strategy for a defect in accordance with embodiments herein. Method 600 may be used by a repair strategy generation system to provide a repair strategy for a robotic repair unit.

In block 610, a defect is identified on a worksurface. Characterizing a defect may include a defect type, a defect severity, or a location on a vehicle. For example, a defect type may include a smudge or a scratch. A defect severity may refer to an area on the worksurface affected by the defect, a length of the defect, a height or depth of the defect, or another characteristic. A defect location may include a coordinate location on a vehicle worksurface. Characterizing the defect may also include height of the defect with respect to the worksurface or a depth with respect to a layer of paint, such as whether the defect is located in a paint or clearcoat layer. Characterizing the defect may also include retrieving pre-repair images of the worksurface. Other features related to the defect may also be retrieved.

Identifying a defect may include identifying a type of defect. The defect type may be excess paint, an embedded piece of debris, a scratch, a dent, an air pocket, a smudge or another defect in a paint surface. Identifying a defect may include identifying a defect location with respect to a surface of a vehicle. Identifying a defect location may also include associating a defect with a point on a surface of a vehicle using a CAD model or a surface mesh of the vehicle. Identifying a defect may also include identifying an effected area of the vehicle surface—for example an embedded debris may not only affect the area of the debris, but likely also impacts a surface area immediately surrounding the debris. The orange peel may be characterized, for example, using method 500 discussed with respect to FIG. 6. However, other methods may also be suitable so long as they occur automatically and consistently from defect to defect.

In block 620, an orange peel of the surface at the defect point is characterized. Previous attempts at repairing defects have relied on orange peel sampling of a surface—identifying an average orange peel of a portion of a vehicle (e.g. a "hood" of a car) and assuming that average holds locally near a defect. A benefit of systems and methods herein include the ability to detect and characterize orange peel at the defect point in order to better tailor the repair strategy to the defect.

In block 630, a repair trajectory is selected. While block 630 is illustrated as following block 620, it is expressly contemplated that the order may be reversed. The trajectory may be selected based on a detected defect size, defect type, defect location, vehicle color, or another suitable parameter. The selected trajectory may include a shape 632 or a path that an abrasive article will follow for the repair. The path 632 may be a closed path, starting and ending at the same point, or an open path, starting and ending at different points. In one embodiment, the positions correspond to a regular shape, including a circle, an elliptical, a rose, an epitrochoid, or a hypotrochoid. In another embodiment, the position 1442 correspond to an irregular shape. The shape may include curvature or straight lines, convex or concave portions, or other features. Generating the path may also include generating one or more orientations. For example, a backup pad may contact the worksurface evenly, such that an even pressure is applied over the surface of the backup pad, and onto the worksurface. In another embodiment, backup pad is at a tilt for at least a portion of the generated path. The tilt may be inward or outward, and may change during the repair, in some embodiments.

The generated path is time parametrized, as indicated by block 634, to generate a repair trajectory. Time parameterizing the path includes assigning a velocity and acceleration along the generated path. Generating the time parameterization requires satisfying dynamic constraints such as maximum velocity and acceleration achievable by the end effector tool as well as the robot itself, as well as jerk. Time parameterization can also include verifying constraints after the trajectory is generated to ensure that the robot and the end effector can accomplish the trajectory. The abrasive article may contact the worksurface for a given amount of time 634 at a variety of positions along the path, or may experience different velocities at different points along path 632. The trajectory may also include other parameters 636 at different points such as an applied force, a grinding angle, etc.

In block 640, the selected trajectory is modified in view of the characterized orange peel at the defect point. For example, mild orange peel may allow for a time 634 to be reduced at one or more points along path 632, while heavier orange peel may require additional time 636 at different points.

Method 600 may be carried out such that the modified trajectory may be immediately implemented by a robotic repair unit. The modifications to a selected trajectory may, in some embodiments, never be presented to a human operator, such that the orange peel characterization remains an internal parameter calculated and used solely by a repair strategy generator. In other embodiments, however, some information regarding detected orange peel is presented to an operator or stored such that an operator can retrieve it later.

Figure 8:
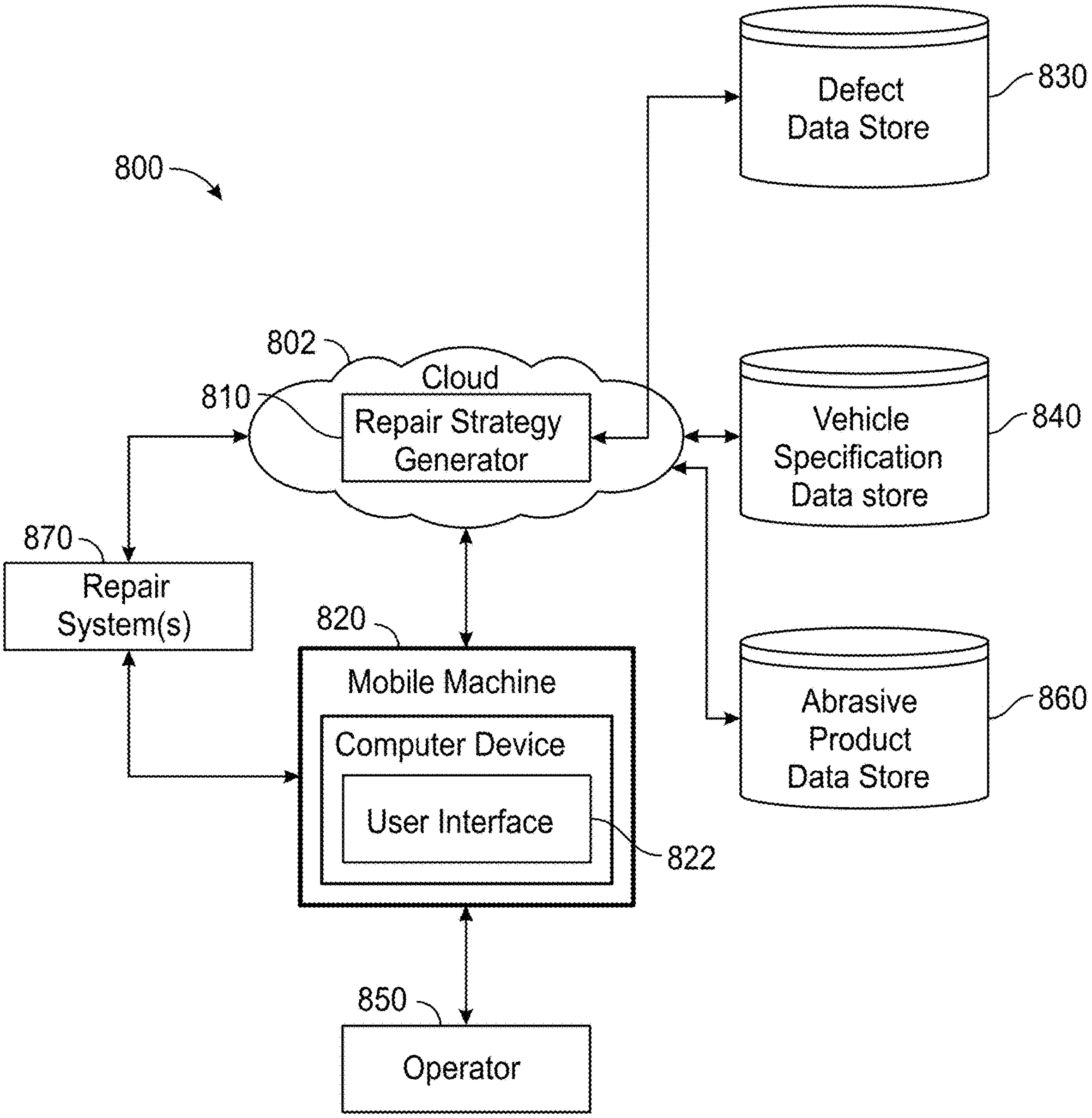
FIG. 8 is a repair strategy generation system architecture.

FIG. 8 is a block diagram of a repair strategy generation architecture. The remote server architecture 800 illustrates one embodiment of an implementation of a repair strategy generator 810. As an example, remote server architecture 800 can provide computation, software, data access, and storage services that do not require end-user knowledge of the physical location or configuration of the system that delivers the services. In various embodiments, remote servers can deliver the services over a wide area network, such as the internet, using appropriate protocols. For instance, remote servers can deliver applications over a wide area network and they can be accessed through a web browser or any other computing component. Software or components shown or described in FIGS. 1-7 as well as the corresponding data, can be stored on servers at a remote location. The computing resources in a remote server environment can be consolidated at a remote data center location or they can be dispersed. Remote server infrastructures can deliver services through shared data centers, even though they appear as a single point of access for the user. Thus, the components and functions described herein can be provided from a remote server at a remote location using a remote server architecture. Alternatively, they can be provided by a conventional server, installed on client devices directly, or in other ways.

In the example shown in FIG. 8, some items are similar to those shown in earlier figures. FIG. 8 specifically shows that a repair strategy generation system can be located at a remote server location 802. Therefore, computing device 820 accesses those systems through remote server location 802. Operator 850 can use computing device 820 to access user interfaces 822 as well.

FIG. 8 also depicts another example of a remote server architecture. FIG. 8 shows that it is also contemplated that some elements of systems described herein are disposed at remote server location 802 while others are not. By way of example, storage 830, 840 or 860 or repair systems 870 can be disposed at a location separate from location 802 and accessed through the remote server at location 802. Regardless of where they are located, they can be accessed directly by computing device 820, through a network (either a wide area network or a local area network), hosted at a remote site by a service, provided as a service, or accessed by a connection service that resides in a remote location. Also, the data can be stored in substantially any location and intermittently accessed by, or forwarded to, interested parties. For instance, physical carriers can be used instead of, or in addition to, electromagnetic wave carriers.

It will also be noted that the elements of systems described herein, or portions of them, can be disposed on a wide variety of different devices. Some of those devices include servers, desktop computers, laptop computers, imbedded computer, industrial controllers, tablet computers, or other mobile devices, such as palm top computers, cell phones, smart phones, multimedia players, personal digital assistants, etc.

Figure 9:
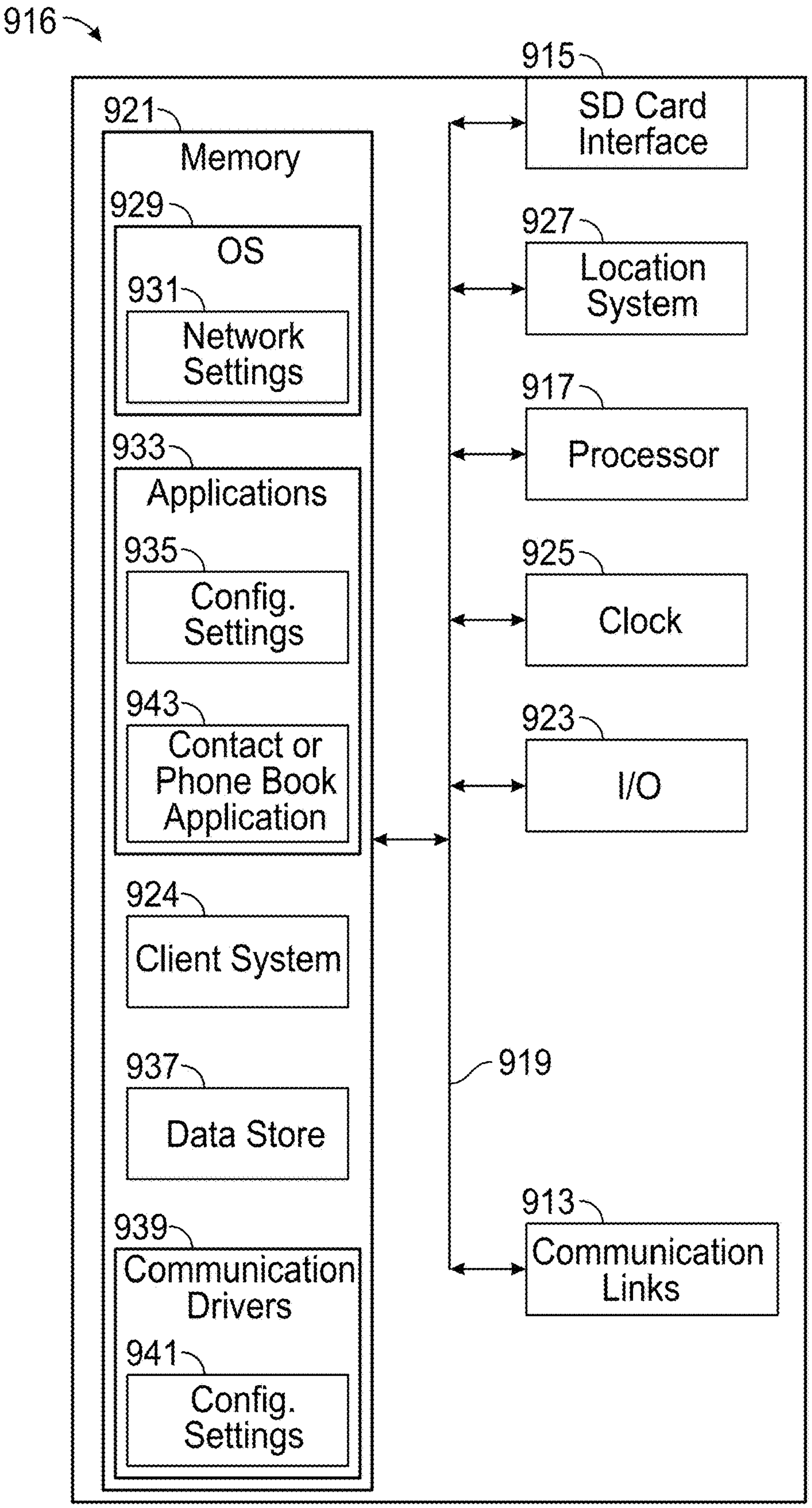
FIGS. 9-10 show examples of mobile devices that can be used in the embodiments shown in previous Figures.
Figure 10:
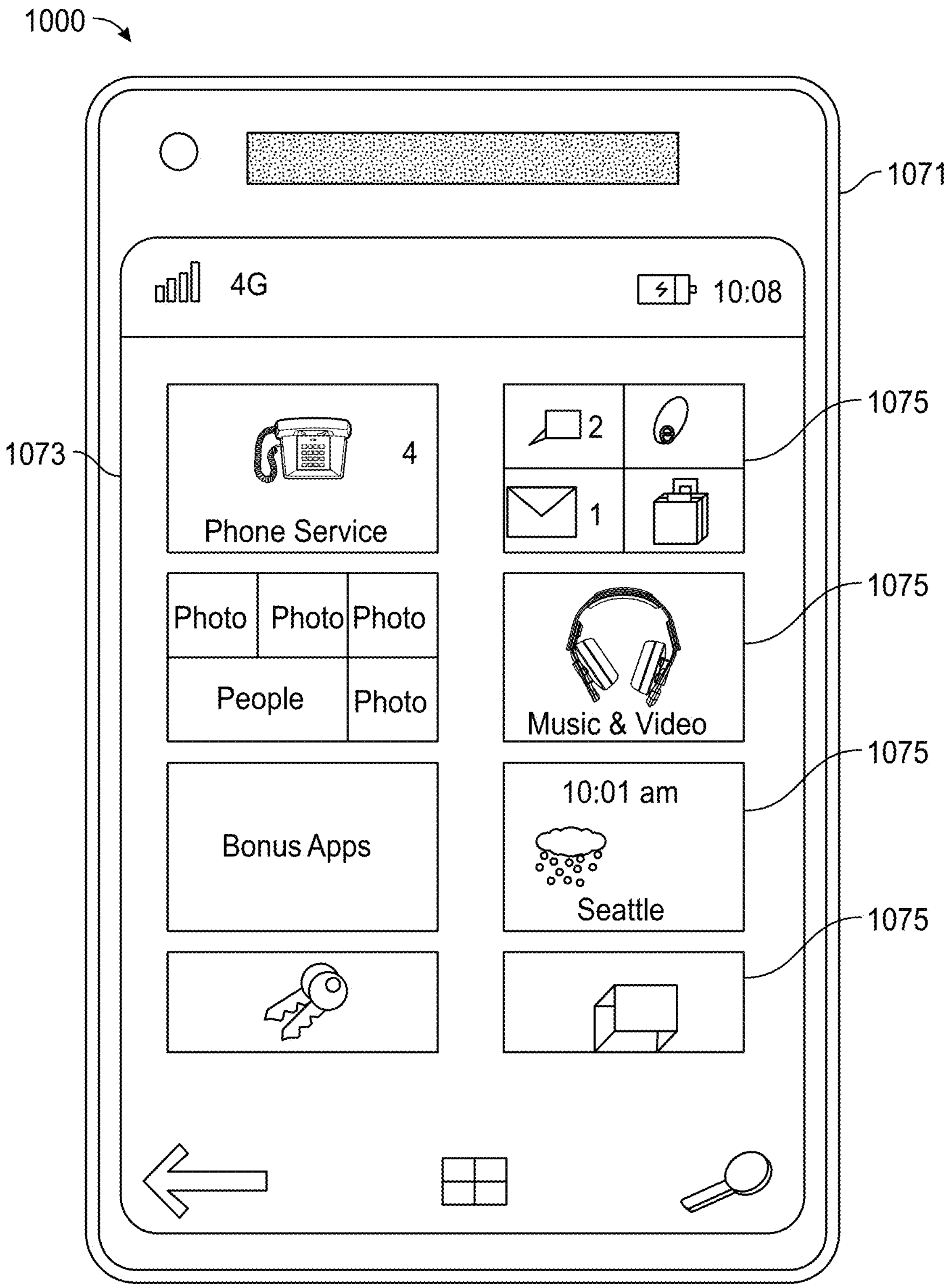

FIGS. 9-10 show examples of mobile devices that can be used in the embodiments shown in previous Figures.

FIG. 9 is a simplified block diagram of one illustrative example of a handheld or mobile computing device that can be used as a user's or client's handheld device 916 (e.g., as computing device 820 in FIG. 8), in which the present system (or parts of it) can be deployed. For instance, a mobile device can be deployed in the operator compartment of computing device 820 for use in generating, processing, or displaying the data. FIG. 10 is another example of a handheld or mobile device.

FIG. 9 provides a general block diagram of the components of a client device 916 that can run some components shown and described herein. Client device 916 interacts with them, or runs some and interacts with some. In the device 916, a communications link 913 is provided that allows the handheld device to communicate with other computing devices and under some embodiments provides a channel for receiving information automatically, such as by scanning Examples of communications link 913 include allowing communication though one or more communication protocols, such as wireless services used to provide cellular access to a network, as well as protocols that provide local wireless connections to networks.

In other examples, applications can be received on a removable Secure Digital (SD) card that is connected to an interface 915. Interface 915 and communication links 913 communicate with a processor 917 (which can also embody a processor) along a bus 919 that is also connected to memory 921 and input/output (I/O) components 923, as well as clock 925 and location system 927.

I/O components 923, in one embodiment, are provided to facilitate input and output operations and the device 916 can include input components such as buttons, touch sensors, optical sensors, microphones, touch screens, proximity sensors, accelerometers, orientation sensors and output components such as a display device, a speaker, and or a printer port. Other I/O components 923 can be used as well.

Clock 925 illustratively comprises a real time clock component that outputs a time and date. It can also provide timing functions for processor 917.

Illustratively, location system 927 includes a component that outputs a current geographical location of device 916. This can include, for instance, a global positioning system (GPS) receiver, a LORAN system, a dead reckoning system, a cellular triangulation system, or other positioning system. It can also include, for example, mapping software or navigation software that generates desired maps, navigation routes and other geographic functions.

Memory 921 stores operating system 929, network settings 931, applications 933, application configuration settings 935, data store 937, communication drivers 939, and communication configuration settings 941. Memory 921 can include all types of tangible volatile and non-volatile computer-readable memory devices. It can also include computer storage media (described below). Memory 921 stores computer readable instructions that, when executed by processor 917, cause the processor to perform computer-implemented steps or functions according to the instructions. Processor 917 can be activated by other components to facilitate their functionality as well.

FIG. 10 shows that the device can be a smart phone 1071. Smart phone 1071 has a touch sensitive display 1073 that displays icons or tiles or other user input mechanisms 1075. Mechanisms 1075 can be used by a user to run applications, make calls, perform data transfer operations, etc. In general, smart phone 1071 is built on a mobile operating system and offers more advanced computing capability and connectivity than a feature phone.

Note that other forms of the devices 1016 are possible.

Figure 11:
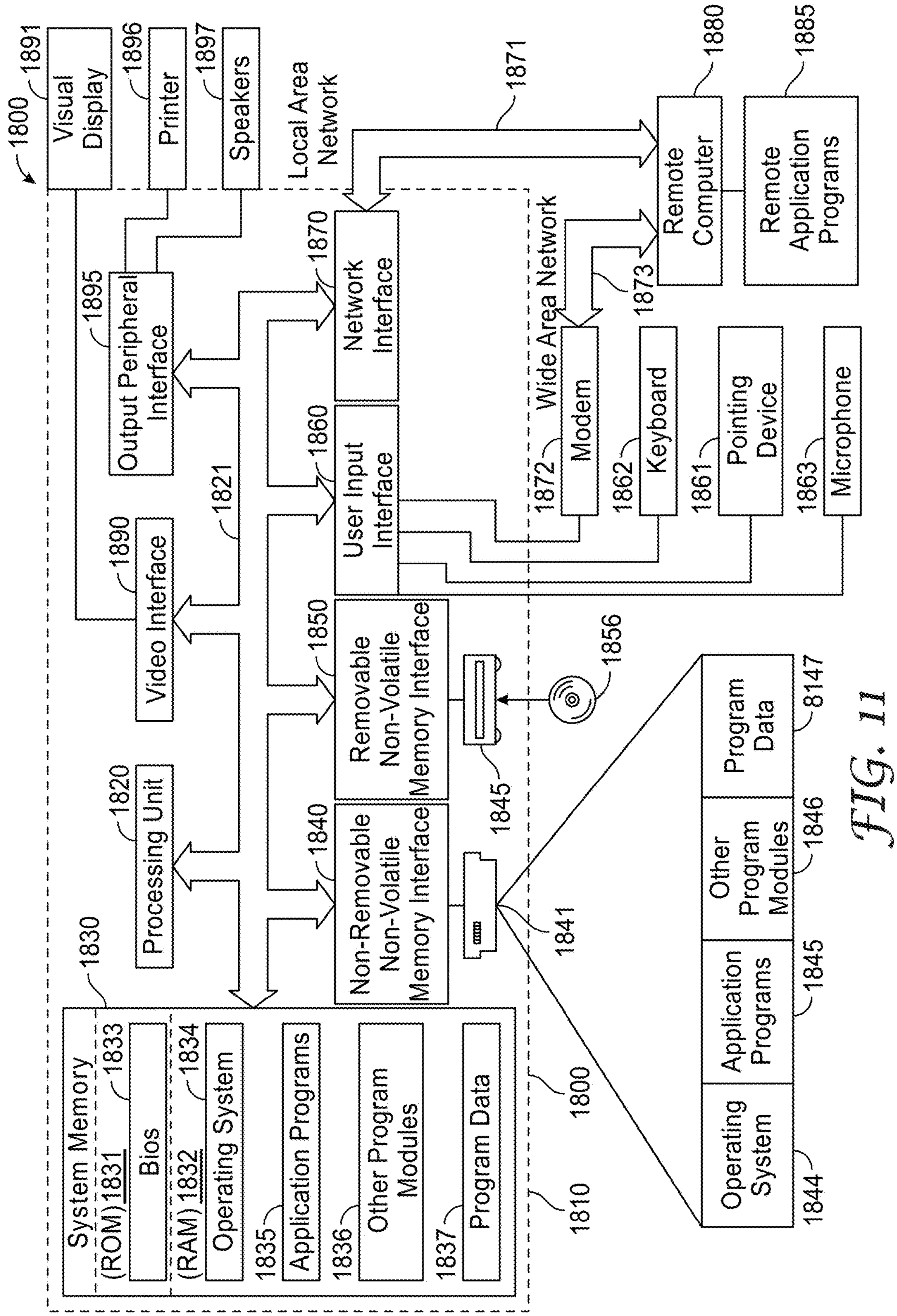
FIG. 11 is a block diagram of a computing environment that can be used in embodiments shown in previous Figures.

FIG. 11 is a block diagram of a computing environment that can be used in embodiments shown in previous Figures.

FIG. 11 is one example of a computing environment in which elements of systems and methods described herein, or parts of them (for example), can be deployed. With reference to FIG. 11, an example system for implementing some embodiments includes a general-purpose computing device in the form of a computer 1110. Components of computer 1110 may include, but are not limited to, a processing unit 1120 (which can comprise a processor), a system memory 1130, and a system bus 1121 that couples various system components including the system memory to the processing unit 1120. The system bus 1121 may be any of several types of bus structures including a memory bus or memory controller, a peripheral bus, and a local bus using any of a variety of bus architectures. Memory and programs described with respect to systems and methods described herein can be deployed in corresponding portions of FIG. 11.

Computer 1110 typically includes a variety of computer readable media. Computer readable media can be any available media that can be accessed by computer 1110 and includes both volatile/nonvolatile media and removable/non-removable media. By way of example, and not limitation, computer readable media may comprise computer storage media and communication media. Computer storage media is different from, and does not include, a modulated data signal or carrier wave. It includes hardware storage media including both volatile/nonvolatile and removable/non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 1110. Communication media may embody computer readable instructions, data structures, program modules or other data in a transport mechanism and includes any information delivery media. The term "modulated data signal" means a signal that has one or more of its characteristics set or changed in such a manner as to encode information in the signal.

The system memory 1130 includes computer storage media in the form of volatile and/or nonvolatile memory such as read only memory (ROM) 1831 and random access memory (RAM) 1132. A basic input/output system 1133 (BIOS) containing the basic routines that help to transfer information between elements within computer 1110, such as during start-up, is typically stored in ROM 1131. RAM 1132 typically contains data and/or program modules that are immediately accessible to and/or presently being operated on by processing unit 1120. By way of example, and not limitation, FIG. 11 illustrates operating system 1134, application programs 1135, other program modules 1136, and program data 1137.

The computer 1110 may also include other removable/non-removable and volatile/nonvolatile computer storage media. By way of example only, FIG. 11 illustrates a hard disk drive 1141 that reads from or writes to non-removable, nonvolatile magnetic media, nonvolatile magnetic disk 1152, an optical disk drive 1155, and nonvolatile optical disk 1156. The hard disk drive 1141 is typically connected to the system bus 1121 through a non-removable memory interface such as interface 1140, and optical disk drive 1155 are typically connected to the system bus 1121 by a removable memory interface, such as interface 1150.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (e.g., ASICs), Application-specific Standard Products (e.g., ASSPs), System-on-a-chip systems (SOCs), Complex Programmable Logic Devices (CPLDs), etc.

The drives and their associated computer storage media discussed above and illustrated in FIG. 11, provide storage of computer readable instructions, data structures, program modules and other data for the computer 1110. In FIG. 11, for example, hard disk drive 1141 is illustrated as storing operating system 1144, application programs 1145, other program modules 1146, and program data 1147. Note that these components can either be the same as or different from operating system 1134, application programs 1135, other program modules 1136, and program data 1137.

A user may enter commands and information into the computer 1810 through input devices such as a keyboard 1162, a microphone 1163, and a pointing device 1161, such as a mouse, trackball or touch pad. Other input devices (not shown) may include a joystick, game pad, satellite receiver, scanner, or the like. These and other input devices are often connected to the processing unit 1120 through a user input interface 1160 that is coupled to the system bus, but may be connected by other interface and bus structures. A visual display 1191 or other type of display device is also connected to the system bus 1121 via an interface, such as a video interface 1190. In addition to the monitor, computers may also include other peripheral output devices such as speakers 1197 and printer 1196, which may be connected through an output peripheral interface 1195.

The computer 1110 is operated in a networked environment using logical connections, such as a Local Area Network (LAN) or Wide Area Network (WAN) to one or more remote computers, such as a remote computer 1180.

When used in a LAN networking environment, the computer 1110 is connected to the LAN 1171 through a network interface or adapter 1170. When used in a WAN networking environment, the computer 1110 typically includes a modem 1172 or other means for establishing communications over the WAN 1173, such as the Internet. In a networked environment, program modules may be stored in a remote memory storage device. FIG. 11 illustrates, for example, that remote application programs 1185 can reside on remote computer 1180.

An imaging and repair system is presented that includes a first imaging system configured to image a defect on a worksurface. The imaging and repair system also includes a second imaging system configured to image and characterize the worksurface at the defect. The system also includes a defect repair processor configured to select a repair strategy based on a defect type. The system also includes a defect modifier configured to modify the selected repair strategy based on the characterization of the worksurface. The system also includes a defect repair tool configured to automatically effect the modified repair strategy.

The system may be implemented such that the first imaging system includes a first camera configured to capture a plurality of first images of the worksurface. The plurality of first images are stored in a data source.

The system may be implemented such that the second imaging system includes a second camera configured to capture a plurality of second images of the worksurface. The plurality of second images are stored in the database. The second camera is separate from the first camera.

The system may be implemented such that the second plurality of images include images of the worksurface proximate the defect.

The system may also include a light source.

The system may also include a defect detector configured to detect the defect in the first plurality of images.

The system may be implemented such that detecting the defect includes detecting a defect type, defect size, defect severity, or defect location.

The system may be implemented such that it also includes a defect analyzer configured to correlate a location of the defect with a position on a 3D representation of the worksurface.

The system may be implemented such that the second imaging system is directed to image the worksurface based on the location.

The system may be implemented such that characterizing the worksurface includes identifying a delta value of orange peel.

The system may be implemented such that it also includes an orange peel processor configured to: sample pixels from an image in the plurality of second images and calculate a delta value based on the sampled pixels.

The system may be implemented such that it includes an orange peel processor configured to: smear an image in the plurality of second images and calculate a delta value based on the sampled images.

The system may be implemented such that the defect repair tool includes: a motive robot arm, a force control unit coupled to the motive robot arm, an end effector coupled to the force control unit, and an abrasive tool coupled to the end effector. The abrasive tool is configured to engage the worksurface at the defect.

The system may be implemented such that it includes an imaging system mount configured to couple to the second imaging system.

The system may be implemented such that the second imaging system includes a light source.

The system may be implemented such that the light source is angled with respect to the worksurface.

The system may be implemented such that the second imaging system is within 1 meter of the surface when the second plurality of images is taken.

The system may be implemented such that the worksurface is a vehicle. The characterization of the worksurface includes a flat surface and, based on the characterized flat surface, the modified repair strategy includes a shorter process time than the selected repair strategy.

An orange peel imaging system is presented that includes an orange peel light source configured to direct light at an area on a worksurface. The system also includes an orange peel camera configured to capture an orange peel image of the area. The system also includes a process camera configured to capture an image of a defect in the area. The system also includes a processor configured to analyze the orange peel image, detect a contour in the area, calculate a delta value for the detected contour, and output the calculated delta value.

The orange peel imaging system may also include an orange peel communicator configured to communicate the output delta value to a second system.

The orange peel imaging system may also include a mount configured to couple the orange peel camera to a robotic repair unit.

The orange peel imaging system may be implemented such that the robotic repair unit is a motive unit capable of bringing the orange peel camera within 2 meters of the worksurface.

The orange peel imaging system may be implemented such that the robotic repair unit includes a force control unit coupled to an end effector. The end effector couples to an abrasive article which contacts the worksurface at the detected defect.

The orange peel imaging system may be implemented such that analyzing the orange peel image includes sampling pixels in the image of the area.

The orange peel imaging system may be implemented such that analyzing the orange peel image includes smearing the image of the area.

The orange peel imaging system may be implemented such that the image of the area is stored in a database.

The orange peel imaging system may be implemented such that the image of the defect is stored in a database.

The orange peel imaging system may also include a repair generation system configured to generate a repair strategy for the defect. The repair strategy is generated at least in part by the analysis of the orange peel image.

A method of characterizing orange peel on a vehicle surface is presented. The method includes acquiring an image, using a camera, of an area of the vehicle surface. The method also includes processing the acquired image, with a processor, to detect a contour in the area. The method also includes identifying, with the processor, a delta value for the contour. The method also includes outputting an analysis result, using a communication channel. The analysis result includes an indication of a detected contour and the detected delta value for the contour.

The method may be implemented such that processing the acquired image includes color correcting the image.

The method may be implemented such that processing the acquired image includes gaussian blurring the image.

The method may also include determining a scale of the detected contour.

The method may also include directing a focused beam of light, from a light source, at the area of the vehicle surface.

The method may be implemented such that the camera is within a range of the area. The range is within a meter.

The method may be implemented such that the camera is brought within the range by a motive robot arm.

The method may be implemented such that the camera is brought within the range automatically in response to a detected defect within the area.

The method may be implemented such that the steps of acquiring, processing, identifying and outputting are performed automatically in response to a detected defect in the area.

The method may be implemented such that the communication channel outputs the analysis result to a repair strategy generator which generates a repair strategy for the detected defect based on the detected contour and detected delta value.

A method of generating a repair process for a defect on a worksurface is presented. The method includes detecting the detect in an area on the worksurface. The method also includes characterizing the area of the worksurface. The method also includes selecting a repair strategy based on the detected defect. The method also includes modifying the selected repair strategy based on the characterized parameter to obtain the repair process. The steps of characterizing, selecting and modifying occur automatically based on the detected defect on the worksurface.

The method may be implemented such that detecting defect includes detecting a defect type, defect size, or defect severity.

The method may be implemented such that detecting includes detecting that the defect is a repairable defect.

The method may be implemented such that selecting a repair strategy includes selecting a repair path along the worksurface for an abrasive article.

The method may be implemented such that the repair path includes a time parameterized series of positions for the abrasive article on the worksurface, and, for each position, the abrasive article experiences a pressure, a velocity, a contact angle or a duration.

The method may be implemented such that modifying the selected repair strategy based on the characterized area includes modifying the experienced pressure, velocity, contact angle or duration.

The method may be implemented such that characterizing the area of the worksurface further includes: acquiring an image of the area of the worksurface, using an orange peel camera, analyzing the image of the area to detect a contour, and calculating a delta value for the detected contour.

The method may also include calibrating the calculated delta value.

The method may be implemented such that the modified repair strategy is provided to a robotic repair unit for automatic execution.

The method may also include outputting an image of the detected defect.

The method may also include outputting the characterization of the worksurface as a numerical value.

The method may be implemented such that the area is characterized as flatter than expected, and modifying the selected repair strategy includes reducing a repair time to compensate for the flatter surface.

The method may be implemented such that the area is characterized as having more significant orange peel than expected. Modifying the selected repair strategy includes increasing a repair time to compensate.

What is claimed is:

1. An imaging and repair system, comprising:

a first imaging system configured to image and detect a defect on a worksurface wherein the first imaging system comprises a first camera configured to capture a plurality of first images of the worksurface, wherein the plurality of first images are stored in a data source;

a motive robotic arm;

a second imaging system, mounted to the motive robotic arm, configured to image and characterize an orange peel of the worksurface in an area proximate the defect, wherein characterizing the worksurface comprises identifying a delta value of orange peel;

a defect repair processor configured to select a repair strategy template based on a defect type;

a strategy modifier configured to modify the selected repair strategy template based on the orange peel characterization of the worksurface; and a defect repair tool, mounted to the motive robotic arm, configured to contact the worksurface and execute the modified repair strategy.

2. The system of claim 1, wherein the second imaging system comprises a second camera configured to capture a plurality of second images of the worksurface, wherein the plurality of second images are stored in the database, wherein the second camera is separate from the first camera.

3. The system of claim 2, wherein the second plurality of images comprise images of the worksurface proximate the defect.

4. The system of claim 1, and further comprising a structured light source.

5. The system of claim 1, wherein the second imaging system is directed to image the worksurface based on a location of the detected defect received from the first imaging system.

6. The system of claim 1, and further comprising an orange peel processor configured to:

sample pixels from an image in the plurality of second images; and calculate a delta value based on the sampled pixels.

7. The system of claim 1, and further comprising an orange peel processor configured to:

smear an image in the plurality of second images; and calculate a delta value based on the sampled images.

8. The system of claim 1, wherein the worksurface is a vehicle, and wherein the characterization of the worksurface comprises a flat surface and wherein, based on the characterized flat surface, the modified repair strategy comprises a shorter process time than the selected repair strategy.

* * * * *